United States Patent [19]
Stashko

[11] Patent Number: 6,029,121
[45] Date of Patent: Feb. 22, 2000

[54] GOLF PIN DISTANCE MEASURING SYSTEM

[76] Inventor: Stephen O. Stashko, 8510 NW. 44th Ct., Lauderhill, Fla. 33351

[21] Appl. No.: 08/916,549

[22] Filed: Aug. 22, 1997

[51] Int. Cl.[7] ...................................................... H04B 1/00
[52] U.S. Cl. .......................... 702/158; 702/149; 342/357; 342/463; 701/207; 701/214
[58] Field of Search .................................... 702/158, 159; 342/357, 463, 300; 701/207, 213–214, 215

[56] References Cited

U.S. PATENT DOCUMENTS

| | | | |
|---|---|---|---|
| 4,136,394 | 1/1979 | Jones et al. | 702/159 |
| 4,703,444 | 10/1987 | Storms, Jr. et al. | 342/463 |
| 4,907,290 | 3/1990 | Crompton | 342/463 |
| 5,043,736 | 8/1991 | Darnell et al. | 342/357 |
| 5,044,634 | 9/1991 | Dudley | 473/169 |
| 5,082,276 | 1/1992 | Stevens | 702/159 |
| 5,305,201 | 4/1994 | Matthew | 700/91 |
| 5,410,753 | 4/1995 | Szabo | 455/88 |
| 5,414,432 | 5/1995 | Penny, Jr. et al. | 342/463 |
| 5,434,787 | 7/1995 | Okamoto et al. | 342/357 |
| 5,524,081 | 6/1996 | Paul | 701/213 |

*Primary Examiner*—Mark S. Hoff
*Assistant Examiner*—Bryan Bui

[57] ABSTRACT

A distance measuring system for use on a golf course is provided that utilizes a portable unit for use by each golfer, and a single base unit. The system provides accurate position and distance information between each portable unit and various course features such as pins and greens, water traps, sand traps, and the like. The base unit and each portable unit utilize the Global Positioning System to determine their local positions. The base unit uses its known position and the known positions of the various course features, with the position from the portable unit to calculate accurate relative distances between the portable unit and the known course features. Position and distance information is communicated between the base unit and the portable units by radio link, along with other desired information. The distances and other information can be displayed at the portable unit. The other transmitted information can include messages to all or specific golfers, such as weather, wind, or emergency information, and requests from the golfers to the base unit, such as refreshment orders, emergency situations, course damage, and the like. The portable units can be hand-held and provide keypad data entry for distance and other requests, and a display.

4 Claims, 5 Drawing Sheets

GOLF PIN DISTANCE MEASURING SYSTEM

BACKGROUND OF THE INVENTION

1. Field of the Invention

This invention relates to distance measuring systems, and more particularly to distance measuring systems for determining the distance between a golfer and a plurality of features on a golf course, including greens and associated pins, water traps, sand traps, and the like.

2. Description of Related Art

During the course of playing a game of golf, the golfer must often determine the distance between the golf ball and the pin of the next green. Knowing the distance that the ball must travel is one of the most important factors the golfer must consider for selection of the proper golf club. In addition, there may be topographical hazards on the course, such as sand or water traps, the current ball distances to which are desired by the golfer.

To estimate these aforementioned distances, the golfer can rely on experience and course knowledge. The results of estimating these distances can vary a great deal, even by the same golfer on different portions of the same course.

In addition, there are known distance measuring systems for golf course application that may produce varying degrees of success.

U.S. Pat. No. 4,136,394 to Jones et al. discloses a golf yardage indicator system that utilizes a remote unit to be carried by the golfer, and a base unit located at or near the pin on the green. The remote unit can transmit a radio pulse to the base unit, which responds with an acoustic signal. The remote unit determines the distance to the base unit by the time interval between transmission of the radio pulse and reception of the acoustic signal based upon the speed of sound through air.

The main problem with the device of the '394 patent is that, in addition to the remote unit, each pin on each green must have a base unit installed, and maintained. With only one golfer, there would be 19 units, consisting of one remote unit for the golfer and 18 base units for the pins. Add golfers, and the number of remote units required increases accordingly. If the distance to other golf course features such as traps were also desired, an additional base unit would be required at each feature. Thus, requiring an increasing number of base and portable units.

If, instead of multiple base units, one base unit could be carried by the golfer and placed upon each pin or feature, the delay in the game required by the golfer walking to each pin, depositing the base unit, and walking back to the golf ball would not be acceptable.

U.S. Pat. No. 4,703,444 to Storms, Jr. et al. discloses a device for determining distances to features on a golf course that utilizes a portable interrogation unit and three base station transmitters that are placed in predetermined positions around the golf course. The base stations transmit ranging signals and are placed such that a substantial portion of the course is within a triangle defined at its vertices by the three stations. The portable unit stores the known locations of the base transmitters and known locations of features on the course. The ranging signals are received and processed by the portable unit to determine the position of the portable unit in relation to the base units, and the distances from the portable unit to the known locations stored in memory. To determine the position of various features on the course, a survey unit is provided which is utilized to determine each feature's position relative to the base units. Each position is stored in the survey unit and then transferred to the portable interrogation unit's memory.

The device of the '444 patent requires a portable unit for each golfer, and three base station units, for a minimum of four units for one golfer. Each feature of the golf course, from which a distance or range to may be desired, must be presurveyed and entered into memory. Accurate position and ranging information is limited to the area within the triangle defined by the position of each base unit.

There is a need for a distance measuring system for golf course use that addresses some of the limitations discussed herein above.

SUMMARY OF THE INVENTION

A distance measuring system for use on a golf course is provided that utilizes a portable unit for use by a golfer, and a single base unit. The system provides accurate position and distance information between the portable unit and various course features such as pins and greens, water traps, sand traps, and the like.

The base unit is placed in a suitable position on the course, such as the pro-shop or club-house. The base unit can include a Global Positioning System (GPS) receiver to determine position, a radio transceiver for communication with the portable units, and a personal computer (PC) and associated software. The radio transceiver preferably operates in the UHF band.

Each portable unit can include a GPS receiver, a radio transceiver for communication with the base unit, a CPU, an input device such as a keypad, a display, and a memory. The portable unit can be hand-held. The radio transceiver preferably operates in the UHF band.

Used without the base unit, each portable unit can determine its position and the position of various features on the golf course. However, the positions determined by the GPS system may not be accurate enough to be used to determine sufficiently accurate distances between features for certain applications, including golf.

GPS positional data, which is derived from an Earth-orbiting satellite system, includes two sources of error, transmission error and "intentional" error. Transmission error is caused mostly by ionospheric delay as signals are transmitted from the earth-orbiting satellites to the GPS receivers. "Intentional" error is a "built-in" error that is due to a decision made by the U.S. government to limit the accuracy provided by the GPS satellite network to all users except the military.

The ionospheric and intentional errors associated with GPS positions are equal for positions that are within a small geographic area measured in a few tens of miles on the Earth's surface. Therefore, if two positions, obtained within a few tens of miles of each other, are subtracted from each other to determine the distance between the positions, the equal positional errors cancel out resulting in an accurate relative distance between the two positions.

The base unit is utilized with the portable unit to provide suitable relative distance accuracies as described herein.

The base unit's position is determined utilizing the base unit's GPS receiver. The position of various known features on the course are also determined, and stored in the base unit. The base unit uses the GPS positions to calculate, and store, distance vector quantities for the base unit and the various known features on the course.

The portable unit's position is determined utilizing the portable unit's GPS receiver. The portable unit then transmits its position information along with a specific feature to which a distance is desired, such as a pin on a green, by radio link to the base unit. The base unit utilizes the stored vector information of the known feature, and the GPS position of the portable unit, to calculate an accurate distance vector from the portable unit to the feature. The base unit then transmits the calculated accurate distance, between the portable unit and the desired feature, back to the portable unit by radio link, were it can be displayed on the portable unit's display.

The position of the various known features of the golf course can be determined by presurvey, which can be completed by physical measurement. Alternately, the portable unit can be utilized to perform the presurvey, which need only be completed once. The position of features on the course can also be estimated, but at a reduced accuracy.

The radio link provided between the portable unit and the base unit can further be used for ancillary functions. For example, the golfer could utilize the communication link to order refreshments, report course damage, report emergency situations, request the location of other golf teams, and the like. The base unit can likewise utilize the communication link to keep track of golfers, restrict usage of certain holes, track and log golf games taking place on the course, page all or specific golfers, report weather warnings and wind information to golfers, and so on.

The personal computer utilized by the base unit can include flexible software programming to perform these functions as well as other custom functions, and print out various reports as required.

Accordingly, it is an objective of the present invention to provide an accurate distance measuring system for golf course usage that utilizes a portable unit and a single base unit.

It is another objective of the present invention to provide an accurate distance measuring system for golf course usage that determines positions utilizing the GPS system and radio communication between the base unit and portable units.

It is a further objective of the present invention to provide an accurate distance measuring system for golf course usage that provides ancillary communication functions between the golfer's portable unit and the base unit.

In accordance with these and other objects which will become apparent hereinafter, the instant invention will now be described with particular reference to the accompanying drawings.

DESCRIPTION OF THE PREFERRED EMBODIMENTS

Figure 1:
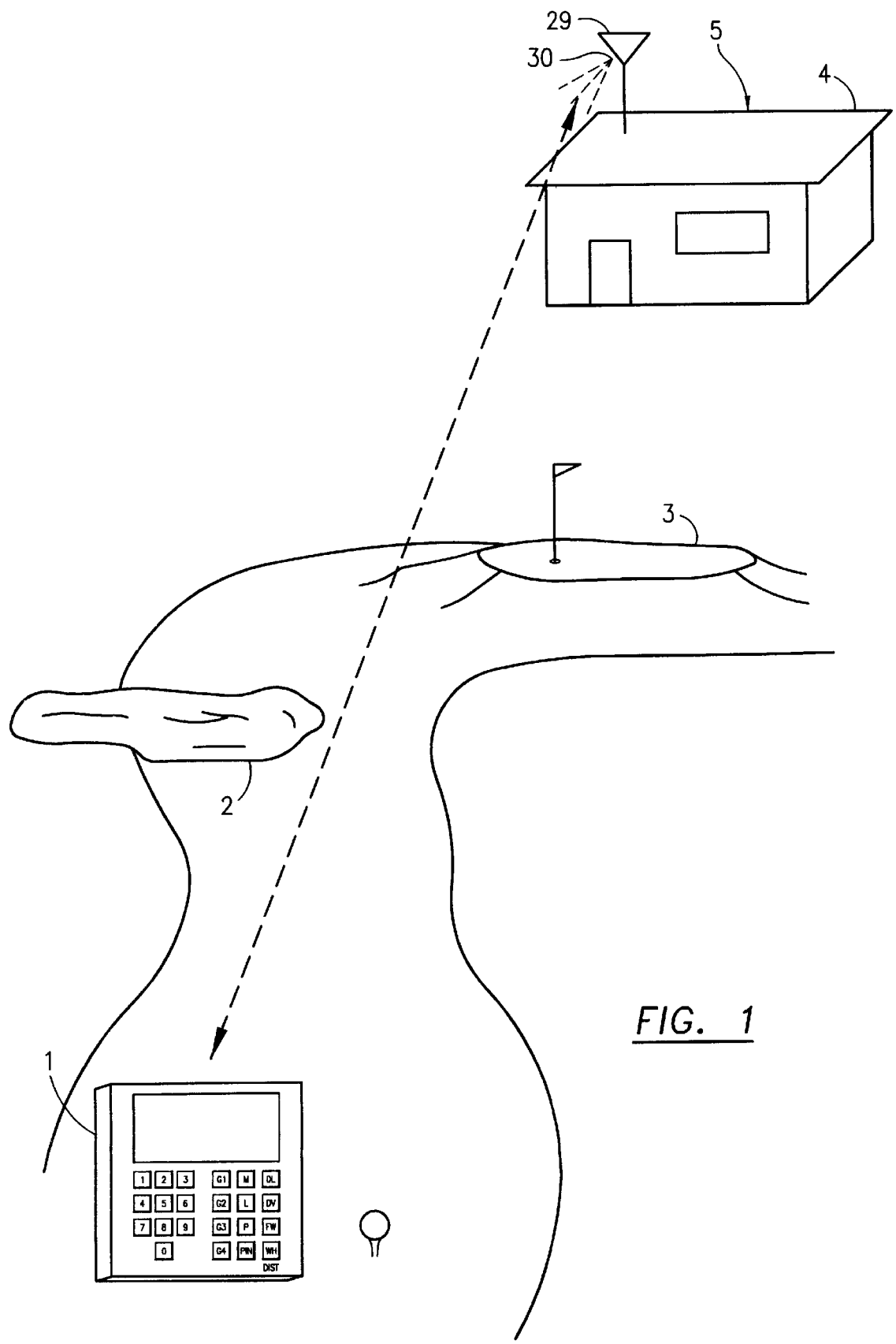
FIG. 1 is a diagrammatic block diagram of one embodiment of the present invention.

Referring to FIG. 1, a preferred embodiment of the present invention includes at least one portable unit 1 and a base unit 5. The base unit 5 is located in the pro-shop or club-house 4 at a known location on the golf course. Fixed features of the golf course also have locations that are known with respect to the base unit 5, such as a water or sand trap 2 and a green and pin 3.

The positions of the known locations of pro-shop 4, and the various known features of the golf course are predetermined from direct physical measurements, or by utilizing positions taken from the Global Positioning System (GPS), as fully described herein.

The base unit 5 maintains two-way radio communication with each portable unit 1. Both the base unit 5 and each portable unit 1 can receive GPS signals and decode them into local GPS coordinates.

The description that follows refers to a portable unit 1, but it should be understood that a plurality of portable units can be utilized with one base unit 5. The portable units 1 are identical to each other, therefore the following description applies to each one of a plurality of portable units 1.

Figure 4:
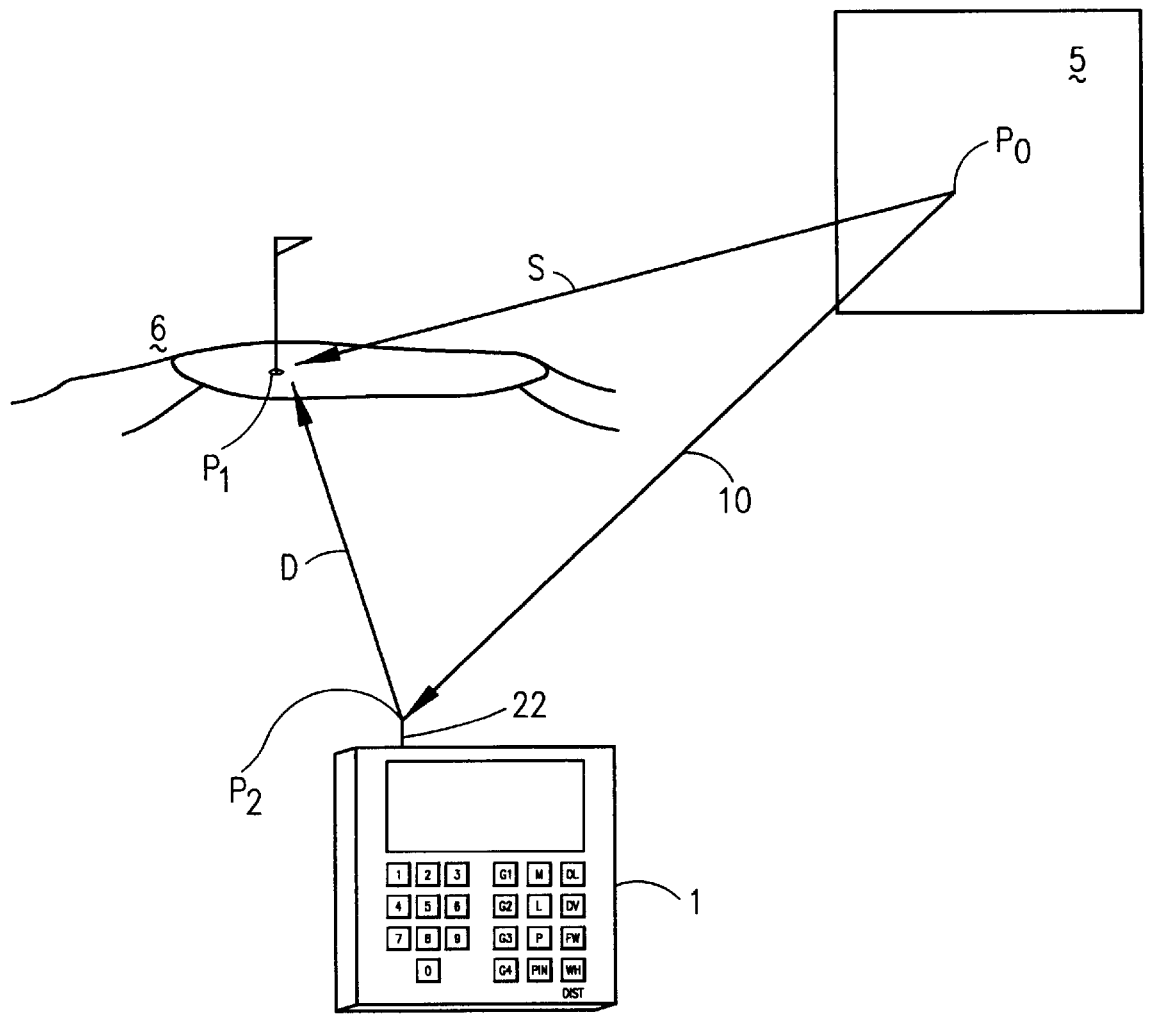
FIG. 4 is a vector diagram illustrating distance vectors used in the present invention.

The purpose of the system is to determine the vector distance D between the portable unit 1 and the position of a feature of interest, such as green 6, as illustrated in FIG. 4. The base unit 5 can determine or be given the vector distance S between its position and the positions of the interesting features on the golf course, such as green 6. The base unit 5 stores an S distance vector for each known feature on the golf course.

Referring to FIG. 4, base unit 5, which can be within pro-shop or club-house 4, is located at point $p_0$, which originates vector S. Vector S describes the distance between base unit 5 and the green 6. Green 6 includes a pin located at a point $p_1$, which terminates vectors S and D. Portable unit 1 is located at a point $p_2$, which originates vector D. Vector D describes the distance between the portable unit 1 and the green 6. An unnamed vector 10 describes the distance between base unit 5 and portable unit 1.

All of the equations that follow are vector equations, and refer to FIG. 4. The following description applies for each distinct golf course feature. Each feature has its own distinct S vector.

Vector S is known because it can be a physically measured distance between the base unit 5 (in pro-shop 4) and a particular pin or other course feature. Vector S can also be determined utilizing portable unit 1 as a presurvey tool to determine the local GPS position of each feature. The predetermined position can be entered into base unit 5 which can then calculate the S vector for that feature.

Base unit 5 uses its GPS position to locate itself at $p_0+r$. Then the position of the pin, to within error r, is known as $p_1$, where $p_1=p_0+r+S$.

Portable unit 1 determines its GPS position as $p_2+r$. The r is the same error r as found at the base unit 5.

Now, $$D=p_1-(p_2+r)$$
$$=p_0+r+S-(p_2+r)$$
$$=p_0+r-r+S-p_2$$
$$=p_0+S-p_2$$

Notice that the error r drops out and D can be calculated as if the correct positions of $p_0$ and $p_1$ were truly known.

Figure 2:
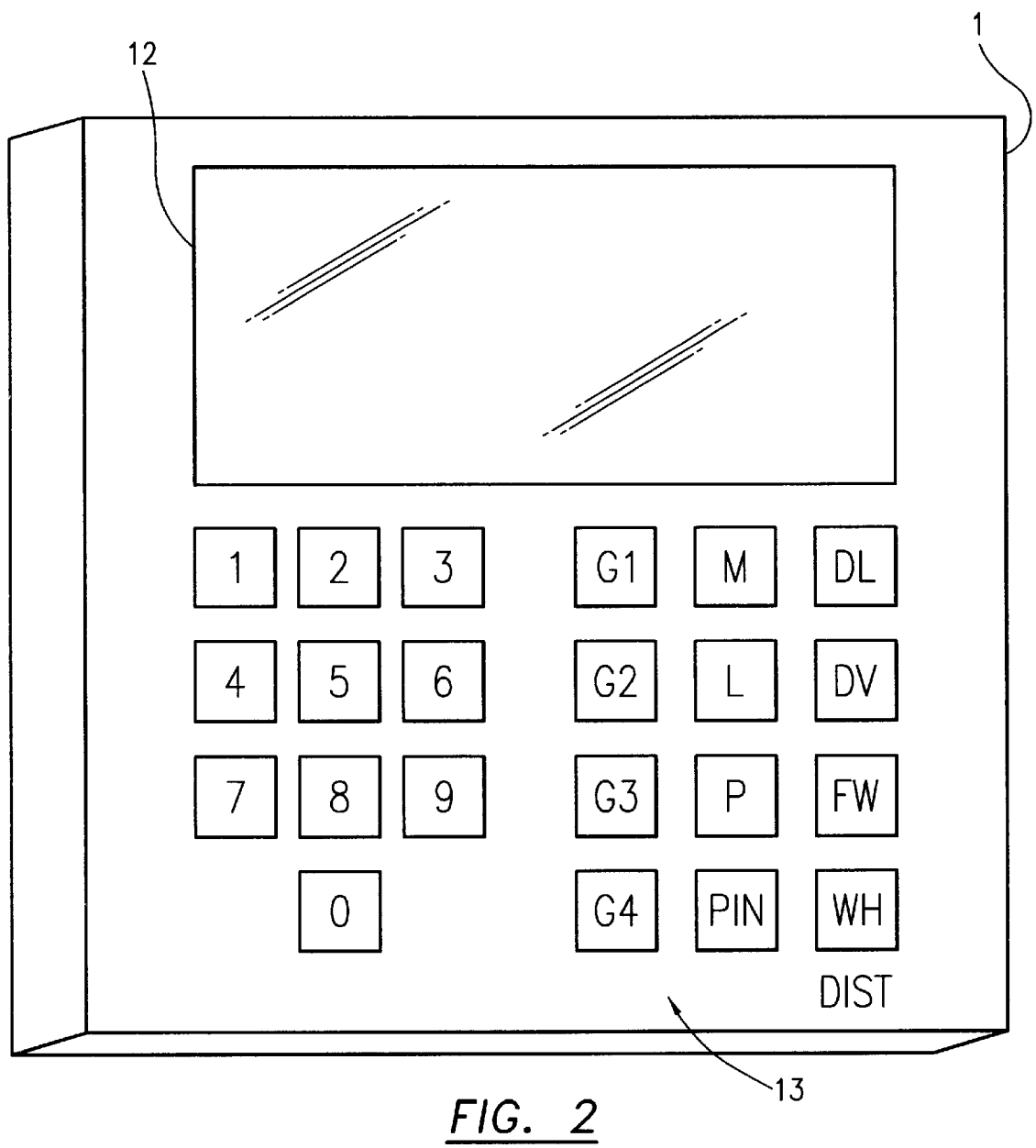
FIG. 2 is a front elevational view illustrating the input and display face of one embodiment of a portable unit for use in the system shown in FIG. 1.

Referring to FIG. 2, one embodiment for portable unit 1 is illustrated. Keypad 13 can include programmable keys for entry of system commands, such as golfer identity (G1–G4), the tee used (M, L, P for men's, ladies', and professional, respectively), types of distances (DL for dog leg, DV for drive, FW for fairway, WH for water hazard distances, and PIN for pin distances). A plurality of numerical keys can also be provided on keypad 13 to enter specific reference numbers associated with specific features. For example, for entry of a distance request for pin number 3, the pin key and the number 3 key would be depressed, preferably in a preselected order. In addition, a feature such as DV for drive distance could be entered for a direct distance. Additional features can be entered to determine dog leg distances past traps and other hazards, and so on.

The display 12 allows the golfer to view any results, both those calculated by the portable unit 1 and those sent by a radio link, as described herein below, from base unit 5. Display 12 can be any suitable display as known in the art Unit 1 can be nearly any size, but is preferably sized to be hand-held. Upon entering a distance request, the results are quickly displayed on display 12.

Figure 3:
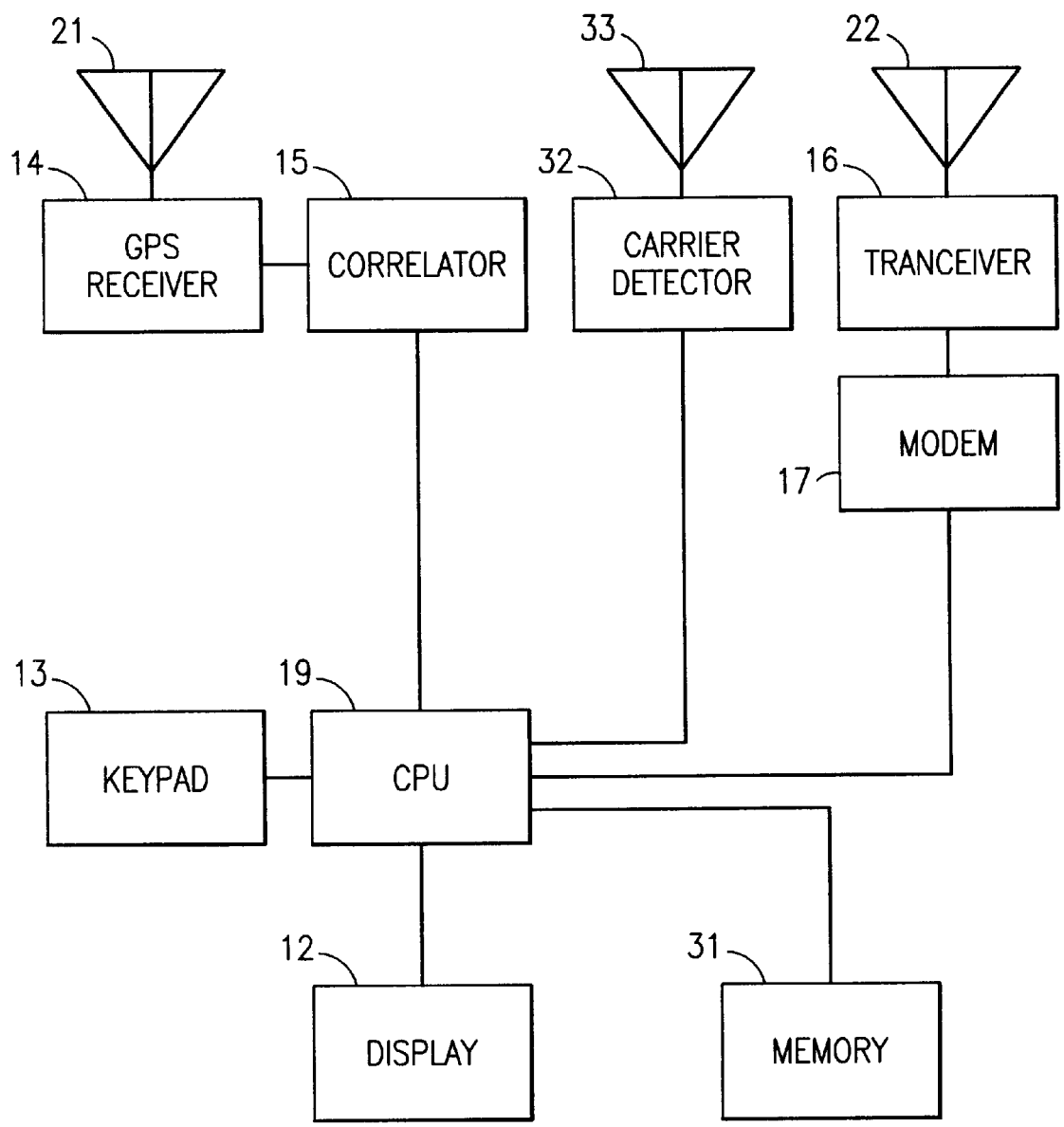
FIG. 3 is a block diagram illustrating the internal function of a portable unit for use in the system shown in FIG. 1.

Referring to FIG. 3. The CPU 19 coordinates events occurring in the portable unit 1. The CPU 19 electrically communicates with the GPS correlator 15, with the carrier detector 32, with the modem 17, with the keypad 13, and with the display 12.

The GPS receiver 14 is connected to a patch antenna 21, through which it receives GPS signals from a plurality of earth-orbiting satellites. The receiver 14 electrically conditions the satellites signals and presents them to the correlator 15. Correlator 15 makes available to the CPU 19 a plurality of electrical representations of the distances between each of a plurality of satellites and the single portable unit 1. The CPU 19 then calculates, from the plurality of electrical representations, the GPS location coordinates of portable unit 1. The CPU, using an internal memory 31, keeps track of the location coordinates.

The portable unit 1 can make position determinations without the need for a base unit 5, but it can do so only with an accuracy of approximately 100 meters. This can be inadequate for golf yardage calculations. The error is due mostly to ionospheric delay errors as the GPS signal moves from the Earth-orbiting satellites to the receiver. The ionospheric error amounts to about 30 meters. The remaining error is intentionally introduced by the U.S. Government.

The intentional degradation is introduced at the transmitting satellite. The ionospheric delay error is introduced only as the signal traverses the ionosphere. No additional delay error is introduced after that. Receivers within a few tens of miles of each other on the earth perceive very similar ionospheric delays. Therefore, if two stations within a few tens of miles on the earth's surface receive GPS signals from the same set of satellites, each station suffers the same delay error.

Referring back to FIGS. 1 and 4, since the base unit 5 and the portable unit 1 have the same delay error for each satellite signal they receive, and since they both receive the same signals, each calculate their respective local GPS positions with the same position error. Since we are obtaining the vector difference between the two stations, the same position error subtracts to zero when the calculations are performed.

Thus, by virtue of GPS information which it possesses, the base unit 5 is capable of making a position correction to the position of portable unit 1. The portable unit 1 must communicate its GPS position (with error) to the base unit 5, so that the latter can use the position information to eliminate error and to correctly calculate the needed distances.

In one embodiment, the portable unit 1 transfers the position information by a radio link to the base unit 5. The radio link portion of portable unit 1 includes modem 17, transceiver 16, and antenna 22. Also, in this embodiment, the radio link can be used to receive data sent from the base unit 5 to the portable unit 1 for final distance reporting, and for other purposes which are described herein below.

In the preferred embodiment of the invention, an interrupt-driven scheme is used to service requests for information by the portable units 1. Other schemes are possible using the same hardware configuration described herein.

For the interrupt driven scheme, a plurality of portable units 1 are serviced by a single base unit 5. It is possible, with such a service arrangement, to have more than one portable unit 1 attempt to make service requests simultaneously.

Referring back to FIG. 3, the simultaneous request problem is managed by having each portable unit 1 contain a carrier detector 32 and antenna 33 for detecting the radio frequency carrier signal used to transmit from the portable units 1 to the base unit 5.

Referring again to FIG. 1, the base unit 5 receives raw GPS position information, preferably from at least four satellites. The data amounts to about 18 bytes per satellite so that 72 bytes, or 576 bits, are required to transfer this data. A few additional bits are needed to identify the transmitting portable unit and to parse the information packet. Then, once corrections are made by the base unit 5 and positions and distances have been calculated therein, a small number of bytes, about 20, are needed to relay that information back to the portable unit 1.

Preferably the radio link will operate in the UHF radio band. Since typical VHF/UHF transceiver chipsets (for example: MC13175/MC13176 UHF AM/FM transmitter) can easily transfer data at 10 kbit/second, this means that a user-initiated request to transmit from a portable unit 1 is completed in about 60 milliseconds. Replies from the base unit 5 can be sent out at a later time so as to minimize the probability of collisions between request from portable units 1. Replies are typically in the 50 byte range, containing distance information, and other information as described herein below.

Truly simultaneous requests, that is, requests that are made from one portable unit 1 before it can detect that another portable unit 1 is transmitting a request, must be under one millisecond apart in time. The probability of this set of circumstances occurring is very low, so we simply allow the system to fail in this case. Quasi-simultaneous requests, that is, requests that are made far enough apart so that the second requesting portable unit 1 recognizes that the first requesting portable unit 1 has a request in progress before the second portable unit 1 begins to transmit, are held by the second portable unit 1 until the first portable unit 1 stops transmitting.

Referring again to FIG. 3, portable unit 1 includes modem 17, transceiver 16, and its associated antenna 22, for communications between portable unit 1 and base unit 5. Transceiver 16 preferably operates in the UHF band. Carrier detector 32, must detect the same band as transceiver 16 operates in.

In an alternate embodiment, carrier detector 32 and transceiver 16 can both share one antenna (not shown) instead of utilizing both antenna 33 and antenna 22, as shown in FIG. 3.

Figure 5:
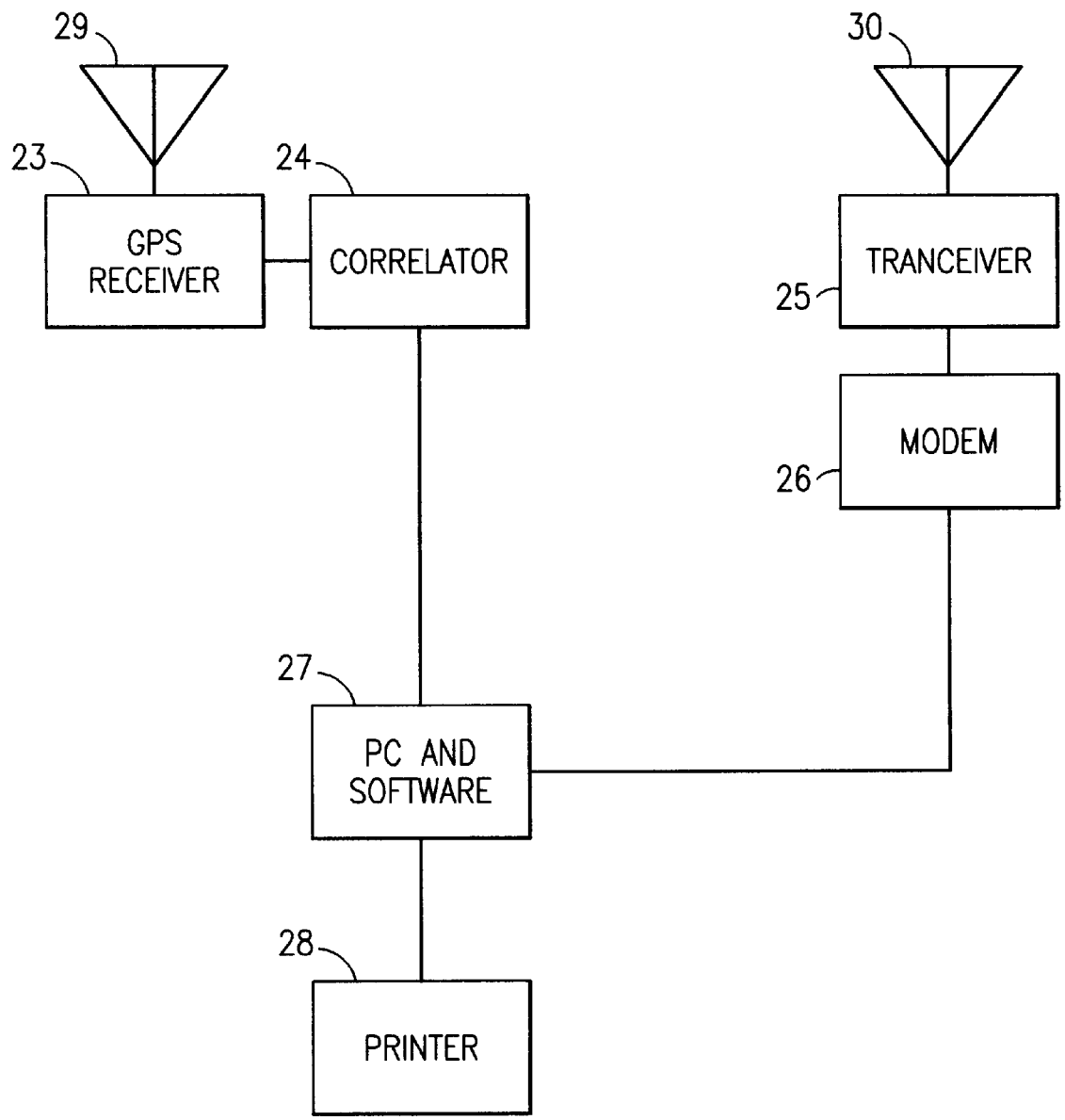
FIG. 5 is a block diagram illustrating the internal function of a base unit for use in the system shown in FIG. 1.

Referring to FIG. 5, base unit 5 can include GPS antenna 29 and GPS receiver front-end 23 to capture radio signals from a plurality of satellites, which contain information necessary to determine local position. Base unit 5 uses the received signals to compute signal delays from each satellite. Base unit S can include correlator 24 and a microprocessor, preferably a personal computer (PC) with appropriate software 27 to compute the signal delays from the satellites. The delays comprise the information containing local position.

The radio link portion of base unit 5 includes modem 26, transceiver 25 and antenna 30 for communications with the portable units 1. Transceiver 25 preferably operates in the UHF band.

Base unit 5 further can coordinate ancillary functions such as league calculations, game management, and accounting. PC and software 27 can be programmed to perform these functions.

PC and software 27 can further provide tracking of a golf game, including scorekeeping and play sequencing. Sequence tracking allows the golf course to better manage course utilization. For example, the system can track which holes have been played, and can restrict replaying of holes. The physical location of golf teams can be tracked. Information can be relayed, via radio link to management personnel, and other golf teams, if desired.

To accomplish the information transfer functions, CPU 19 in portable unit 1, and PC and software 27 in base unit 5 can include compatible software interface modules. Some of the information may be stored and processed in the CPU 19 and memory 31, respectively, while some may be stored and processed by PC and software 27 in base unit 5.

The system further provides prompting and paging of the portable unit 1 from the base unit 5 by the radio link. The base unit 5 can send information for display to all or selected portable units 1. Information such as sponsor advertisement, weather warnings, wind information, and paging may be sent. Golfers may order refreshments by the radio link. The portable units 1 can send information to the base unit 5, enabling features such as requests for player game history, calls for emergency help, and reporting of course damage.

The system can further keep records related to league functions, keep records related to accounting functions, print scorecards, print accounting related cards and sheets, and store administrative information in a database. These functions are accomplished by base unit 5's PC and software 27, and by printer 28.

Because PC and software 27 of base unit 5 is programmed to enable most of the system's functions, and because of the availability, power, and flexibility of computer programming, the system can remain flexible so that new features can be easily added.

Base unit 5 can also retrieve and retain the battery charge status of portable units 1. Base unit 5 can alert personnel to the necessary action related to maintaining the battery charge state of portable units 1. It is anticipated that each golf course will employ up to two hundred portable units 1. The system provides for battery charging to be performed with as little human intervention as possible.

The instant invention has been shown and described herein in what is considered to be the most practical and preferred embodiment. It is recognized, however, that departures may be made therefrom within the scope of the invention and that obvious modifications will occur to a person skilled in the art.

What is claimed is:

1. A golf course distance measuring system, comprising:

a base unit located at a known location on a golf course;

a portable, hand-held unit to be carried by a user such as a golfer or course surveyor;

means located in said base unit, for receiving a plurality of first positional satellite timing signals;

means located in said base unit for entering and storing said known location of said base unit;

means located in said base unit, for calculating a plurality of numerical correction factors utilizing said first positional satellite timing signals and said known location of said base unit;

means located in said base unit, for transmitting said plurality of numerical correction factors to said hand-held unit;

means located in said hand-held unit, for receiving a plurality of second positional satellite timing signals;

means located in said hand-held unit, for transmitting and receiving radio communication signals for receiving said plurality of transmitted numerical correction factors;

means located in said hand-held unit for applying said plurality of transmitted numerical correction factors to said plurality of second positional satellite timing signals to produce an accurate position of said hand-held unit;

means located in said hand-held unit for transmitting request data wherein said request data includes said accurate position of said hand-held unit;

means located in said base unit for receiving and storing said request data;

means located in said base unit for receiving and storing a plurality of previously stored locations of various points of interest found on a golf course;

means located in said base unit for using said request data and said stored locations to calculate data representing a distance between said user and a point of interest on a golf course;

means located in said base unit for transmitting said distance data to said hand-held unit;

means located in said hand-held unit for receiving said distance data;

means located in said hand-held unit for displaying said distance data;

a microprocessor located in said hand-held unit for controlling all said means therein;

a programmable computer located in said base unit for controlling all said means therein; and means for supplying power to said hand-held unit.

2. The system of claim 1 further including a plurality of said portable, hand-held units.

3. A golf course distance measuring system, comprising:

a base unit located at a known location on a golf course;

one or more portable, hand-held units, wherein each of said units can be carried by a user such as a golfer or course surveyor;

means located in said base unit for receiving a plurality of first positional satellite timing signals;

means located in said base unit for entering and storing said known location of said base unit;

means located in said base unit for calculating a plurality of numerical correction factors utilizing said first positional satellite timing signals and said known location of said base unit;

means located in said base unit for transmitting said plurality of numerical correction factors to said hand-held units;

means located in each of said hand-held units, for receiving a plurality of second positional satellite timing signals;

means located in each of said hand-held units for receiving said plurality of transmitted numerical correction factors;

means located in each of said hand-held units for applying said plurality of transmitted numerical correction factors to said plurality of second positional satellite timing signals to produce an accurate position of each said hand-held unit;

means located in each of said hand-held units for accepting a user input;

means located in each of said hand-held units for transmitting request data including but not limited to an identification code representing each said hand-held unit, a plurality of numerical values representing each said accurate hand-held unit position, and a request code identifying a request by a user of said hand-held unit, wherein said request data includes said accurate position of each said hand-held unit;

means located in said base unit for receiving and storing said request data;

means located in said base unit for receiving and storing a plurality of previously stored locations of various points of interest found on a golf course;

means located in said base unit for using said request data and said stored locations to calculate data representing a distance between said user and a point of interest on a golf course;

means located in said base unit for transmitting said distance data to each of said hand-held units;

means located in each of said hand-held units for receiving said distance data;

means located in each of said hand-held units for displaying said distance data;

a microprocessor located in each of said hand-held units for controlling all said means therein;

a programmable computer located in said base unit, for controlling all said means therein; and means for supplying power to each of said hand-held units.

4. A method for measuring golf course distances comprising the steps of:

providing a base unit located at a known location on a golf course;

providing one or more portable, hand-held units, wherein one of said units can be carried by a user such as a golfer or course surveyor;

receiving a plurality of first positional satellite timing signals at said base unit;

entering and storing said known location of said base unit;

calculating a plurality of numerical correction factors utilizing said first positional satellite timing signals and said known location of said base unit;

transmitting said plurality of numerical correction factors to said hand-held units;

receiving a plurality of second positional satellite timing signals at each said hand-held unit;

receiving said plurality of transmitted numerical correction factors at each said hand-held unit;

applying said plurality of transmitted numerical correction factors to said plurality of second positional satellite timing signals received by each said hand-held unit to produce an accurate position of each said hand-held unit;

accepting a user input at each said hand-held unit;

transmitting request data to said base unit including but not limited to, an identification code representing each said hand-held unit, a plurality of numerical values representing each said accurate hand-held unit position, and a request code identifying a request by a user of said hand-held unit, wherein said request data includes said accurate position of each said hand-held unit;

receiving and storing, in said base unit, said request data;

receiving and storing, in said base unit, a plurality of previously stored locations of various points of interest found on a golf course;

using said request data and said stored locations to calculate data representing a distance between said user and a point of interest on a golf course;

transmitting said distance data to each said hand-held unit;

receiving said distance data at each said hand-held unit;

displaying said distance data at each hand-held unit;

controlling all said means within each hand-held unit via a microprocessor contained therein;

controlling all said means within said base unit via a programmable computer contained therein; and supplying power to each of said hand-held units.

* * * * *